United States Patent Office 3,022,672
Patented Feb. 27, 1962

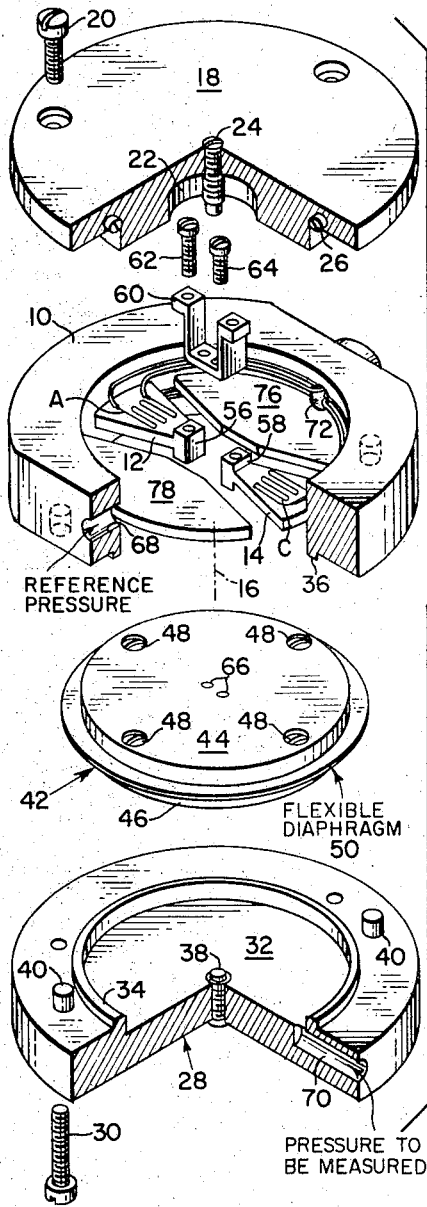

3,022,672
DIFFERENTIAL PRESSURE CELL
John Dimeff and Murray S. Gardner, San Jose, Calif., assignors, by mesne assignments, to the United States of America as represented by the Administrator of the National Aeronautics and Space Administration
Filed May 12, 1958, Ser. No. 734,805
4 Claims. (Cl. 73—398)
(Granted under Title 35, U.S. Code (1952), sec. 266)

The invention described herein may be manufactured and used by or for the Government of the United States of America for governmental purposes without the payment of any royalties thereon or therefor.

The present invention relates to a high-precision fluid pressure measuring device which is relatively insensitive to changes in ambient temperature, and which in addition is so constructed that its accuracy remains substantially unaffected by momentary conditions of extreme overload.

It is of great importance in certain manufacturing and/or testing processes to know in advance the pressures to which an assembly or a component being evaluated will be subjected during actual use. This permits a production design to be worked out which will withstand these anticipated forces with a calculated margin of safety. The problem is of particular concern in the aircraft industry, since pressure loads on different sections of a plane for the variety of conditions encountered during flight may vary over an extremely wide range. It is of inestimable value to be aware of such limits during the developmental period, thus eliminating the possibility that laborious and costly component changes may be necessary after mass production of the aircraft has begun.

To provide the required information, research facilities have been established which include transonic, supersonic, and hypersonic wind tunnels, vacuum tunnels, shock-tube tunnels, and many other types of tunnels and chambers for simulating different wind and/or pressure conditions. It is not surprising that the wide variety of environments which can be artificially created by these research facilities should cause problems to arise in connection with an accurate measurement of the pressures developed therein. It has been found that measuring equipment which is available commercially is not always satisfactory for this purpose, since such apparatus is usually intended for industrial applications where the performance requirements are generally not too severe.

One approach to the design of measuring equipment, and one which has been widely used in the past, is that involving the application of an unknown pressure force to a column of liquid or to a mechanical beam. With respect to the former, changes in the level of the liquid column in accordance with pressure changes are sensed by a follower servo the motion of which is related to the initiating pressure. In the latter method, movement of the beam in response to an applied pressure is sensed by a position transducer which controls the servo acting in turn to apply to the beam a repositioning force.

Such expedients possess the disadvantage of requiring a relatively long period of time to recover following the measurement of a force of any appreciable magnitude, due primarily to the nature of the servomechanism itself. Furthermore, mechanical follower devices and force-balancing arrangements, as well as the electrical circuitry associated therewith, are sufficiently high in cost to prohibit any extensive use of such equipment.

In accordance with a preferred embodiment of the present invention, a pressure transducer is provided which eliminates many of the above-mentioned disadvantages, thus rendering the disclosed device capable of wide application in such fields as wind tunnel research, oil and gas refinery operations, etc. Since the invention device yields a voltage directly proportional to the applied pressure, the output therefrom can be monitored by conventional voltage indicating and recording apparatus, or, if desired, can be coupled directly to the input of an analogue-to-digital converter. In addition, the apparatus set forth herein is inexpensive to manufacture, sturdy in construction, and possesses an unusually fast response as compared to prior art arrangements. Experiments have shown that a pressure cell constructed in accordance with the principles of the present invention is accurate to within 0.1 percent of full scale throughout a wide temperature range, and can stand momentary overloads of 2,000 to 3,000 percent without discernible damage or change in calibration.

One object of the present invention, therefore, is to provide a high-precision differential pressure cell.

Another object of the invention is to provide a differential pressure cell which is designed for use without appreciable sacrifice of accuracy in a varying temperature environment and in applications where high momentary overloads are occasionally encountered.

A further object of the invention is to provide an electromechanical pressure transducer the voltage output of which varies essentially linearly with changes in the pressure to be measured.

A still further object of the invention is to provide a pressure-responsive device of the nature described, which is not only sturdy in construction but which in addition is capable of being produced in quantities at relatively low cost.

Other objects and many of the attendant advantages of this invention will be readily appreciated as the same becomes better understood by reference to the following detailed description when considered in connection with the accompanying drawings wherein:

FIG. 1 is an exploded isometric view of a preferred form of differential pressure cell constructed in accordance with the principles of the present invention;

FIG. 2 is a cross-sectional view of an assembled pressure cell of the type shown in FIG. 1;

FIG. 3 is a schematic showing of one form of electrical indicating circuit in which the pressure cell of FIGS. 1 and 2 may be incorporated; and FIG. 4 is a graph of output error plotted against differential pressure in pounds per square inch for a typical transducer designed in accordance with the present invention.

Referring now to FIGS. 1 and 2, there is illustrated a preferred form of transducer assembly designed in accordance with the principles of the present invention. This transducer unit includes a body member 10 preferably composed of some material possessing a high degree of rigidity, such, for example, as SAE 6150 steel hardened to Rockwell C–60. Although the configuration of body member 10 is not in any sense critical, it is shown as being generally tubular. Formed integrally with, or rigidly attached to, the inner surface of body member 10 are two oppositely-disposed arms 12 and 14 extending radially inwardly in coplanar fashion and being preferably composed of the same material as that of the body member 10. The plane of arms 12 and 14 lies normal to the longitudinal axis 16 of member 10, as best shown in FIG. 1. It has been found desirable in practice to machine the body member 10, together with the diametrically-opposed arms 12 and 14, from the same block of material, since, as will become apparent as the description proceeds, it is highly desirable that no mounting stresses be transferred to the arms to adversely affect the accuracy of the indications obtained from the transducer. In this same connection, the walls of the body member 10 are chosen to be of somewhat massive design, so that the housing assembly per se will possess an extremely rigid assembly.

A top cap or cover 18 is secured to the body member 10 by a plurality of screws 20. Cover 18 is provided with an inner surface contoured as best shown in FIG. 2, arranged to form a central recess 22 containing the axially-mounted set screw 24. An O-ring 26 establishes a fluid-tight seal between cap 18 and body member 10.

A bottom cap or cover 28 is secured to the body member 10 by a plurality of screws 30. Cover 28 is designed with a recessed portion 32, the wall of which extends upwardly (in the drawing) to form an annular shoulder 34. The latter is configured to match a downwardly-extending annular shoulder 36 formed on body member 10, as shown in both FIGS. 1 and 2. A set screw 38, coaxial with screw 24, extends from exterior of the assembly into the recess 32. The two members 10 and 28 are indexed by two pins or dowels 40 to facilitate a proper positioning of the shoulders 34 and 36 relative to one another during assembly.

It will now be seen that when the top cover 18 and the bottom cover 28 are in place, they form, together with body member 10, a closed chamber adapted to receive fluids under pressure. The manner in which these fluids are respectively contained and measured will now be described.

The closed chamber formed by the elements 10, 18, and 28 is effectively divided into two fluid-receiving compartments by a movable piston, generally identified in FIG. 1 by the reference number 42. Piston 42 is composed of rigid material preferably of relatively low weight, such, for example, as aluminum alloy. It is formed in two parts, shown in the drawing as consisting of an upper half 44 and a lower half 46, secured together by a plurality of screws 48. Between the piston sections 44 and 46 is clamped a thin flexible diaphragm 50, which is greater in diameter than piston 42 and hence extends radially beyond the periphery of the piston in the manner best shown in FIG. 1. Openings in diaphragm 50 permit passage of the screws 48 (FIG. 2). While a number of suitable materials are available from which the diaphragm 50 may be composed, it has been found that latex rubber, or neoprene, of approximately .011 inch thickness possessing a Shore hardness of approximately 30 is especially satisfactory.

The piston 42 is intended to undergo limited movement along the axis 16 of the pressure cell. Referring especially to FIG. 2, it will be noted that the piston subassembly, consisting of elements 44, 46, 48, and 50, is so positioned that diaphragm 50 lies adjacent the line of contact between the upwardly-extending shoulder 34 of cap 28 and the downwardly-extending shoulder 36 of body member 10. Since diaphragm 50 is, as previously stated, of greater diameter than piston 42, it is effectively clamped between shoulders 34 and 36 during assembly to divide the inner chamber of the pressure cell into two fluid-tight compartments 52 and 54 (FIG. 2). Due to the flexible nature of the diaphragm, however, the latter does not prevent a limited movement of the piston along axis 16 in response to pressure differences which are developed between compartments 52 and 54 in a manner now to be described.

Referring again to FIG. 2, it will be seen that the inwardly-extending arms 12 and 14 are each provided with an enlarged terminal portion 56 and 58, respectively. These terminal portions 56 and 58 accommodate therebetween a generally U-shaped bracket or flexure yoke 60 the ends of which are respectively secured to the arms 12 and 14 by a plurality of screws 62. While this is a preferred treatment making for ease of construction, the same configuration may be obtained by machining yoke 60 from the extension of arms 12 and 14 which results in an integral connection between arms 12 and 14. The mid-portion of yoke 60 is rigidly attached to the surface of the upper piston section 44 by further screws 64 receivable in openings 66 (FIG. 1). As a result, the piston 42 is rigidly attached to and supported by the arms 12 and 14 so as to be effectively cantilevered, and any axial movement of piston 42 in response to pressure forces thereon is transmitted through yoke 60 to the inner ends 56 and 58 of the arms 12 and 14, respectively. Since the outer extremities of these arms are integral with the body member 10, such a piston movement is translated into a deformation of the arms, the magnitude of such deformation being proportional to the applied stress.

Movement of piston 42 results from a difference in the pressure of the fluids in compartments 52 and 54, respectively. The fluid in compartment 52 is introduced therein through a port 68 in body member 10 and is maintained at a predetermined constant level. It is therefore designated the "reference pressure." Fluid in compartment 54, on the other hand (under an unknown degree of pressure) is introduced through the port 70 in the bottom cap 28. The membrane 50, as best shown in FIG. 2, precludes any mixing of the fluids in their respective compartments.

The deformation of arms 12 and 14 under varying differential pressure conditions may be measured by any suitable means, such, for example, as by the strain gages A, B, C, and D of FIGS. 1 and 2. These strain gages each comprise a continuous metallic conductor or filament the electrical resistance of which changes in accordance with changes in the strain induced therein. Gages A and C are each composed of a continuous conductor wound back and forth on the upper surfaces of arms 12 and 14, respectively, while the conductors of gages B and D are wound back and forth on the corresponding lower surfaces of the arms (FIG. 2). The wires are so wound that their major portions extend essentially radially as shown in FIG. 1 in order to obtain maximum sensitivity. A strain induced in the arms 12 and 14 can thus be read as a measurement of the pressure inducing such strain.

While strain gages of the type described are well-known in the measuring art, it might be mentioned that a particularly suitable design utilizes Advance resistance wire configured to be of 7/8 inch over-all length and of 350 ohms impedance, although obviously any copper-nickel alloys having good electrical properties and known strain sensitivities may be substituted therefor. The filaments of each gage are insulated from the arm with which they are associated by a nonconductive lacquer, or, alternatively, a thin layer of mica. The filaments may be secured to the arm by a suitable adhesive such as Duco cement. The assembly may, if desired, be then sprayed or brushed with one or more coats of Glyptal cement. In certain cases, electrodeposited strain gages instead of the wire or filament type may be utilized.

Each of the strain gages A, B, C, and D has two output connections which pass through an opening 72 in the body member 10. This opening is made fluid-tight by any suitable type of sealed electrical plug which, since it may be of conventional construction, has not been illustrated in the drawing. The eight leads from the strain gages are preferably connected into a standard electrical measuring circuit of the bridge type as shown in FIG. 3, and any potential variations read on the usual voltmeter which may be calibrated in terms of pressure.

It will be apparent that an upward movement of piston 42, for example, will impose a compressional strain on gages A and C, and a tensional strain on gages B and D. The gages are so connected in the circuit of FIG. 3 that the resulting changes in resistance are additive in the output circuit.

To preclude damage to the transducer assembly under high pressure overloads, the piston 42 is limited in the extent of its movement. This is accomplished by means of the set screws 24 and 38, the former contacting the surface of yoke 60 when the piston 42 has moved upwardly a predetermined maximum permissible amount, while the set screw 38 contacts the lower surface of piston section 46 when a predetermined maximum permissible downward piston movement has been reached. Each of set screws 24 and 38 is manually adjustable from exterior of the transducer, and, to insure against leakage of fluid, sealing compound is placed around the screw heads, as shown at 74 in FIG. 2, after their correct rotational position has been established.

It should be noted that the arms 12 and 14 should extend in a direction generally parallel to the grain of the material from which such arms (as well as the body member 10) are fabricated. When designed as set forth herein, and from the material suggested, the disclosed pressure cell will operate well within the linearity limits of the material's elastic constants. Full-scale stress on arms 12 and 14 may be in the order of 15,000 pounds per square inch. It should be especially noted that, due to the symmetrical nature of the arms 12 and 14 and yoke 60, motion of the piston 42 is always linear along the axis 16 of the assembly.

FIG. 4 shows a calibration curve for a ±4 lbs. per square inch pressure cell designed as set forth herein, although cells have been constructed to accommodate ±100 pounds per square inch. It will be observed that the pressure error is generally less than .05 percent of the total range, taking into account not only normal thermal errors but also those due to hysteresis and operational nonlinearities. Provision of the stops 24 and 38 permits accidental overloads of as much as 110 pounds per square inch without permanent damage to the transducer.

The design set forth above is particularly suited for production on metal turning lathes. However, satisfactory results are also obtainable in other ways, as by milling operations. When the body member 10 is made from a single piece of metal, cutting of the coplanar arms 12 and 14 permits the retention of two oppositely-disposed side members 76 and 78, which act as lateral braces to lend additional structural rigidity to the assembly.

Obviously many modifications and variations of the present invention are possible in the light of above teachings. It is therefore to be understood that within the scope of the appended claims the invention may be practiced otherwise than as specifically described.

We claim:

1. In a differential pressure cell, a tubular body member, a top cap for said body member, a bottom cap for said body member, said caps together enclosing said body member to form a chamber of generally cylindrical outline, a disc-shaped piston positioned within said chamber and mounted on a flexible diaphragm, for limited movement along the longitudinal axis of the chamber, said diaphragm effectively dividing said chamber into two fluid receiving compartments, a pair of oppositely-disposed arms lying in a plane essentially normal to the axis of movement of said piston, said arms extending inwardly from the wall of one of said compartments and being formed integrally with said body member, means including a generally U-shaped flexure yoke the extremities of which are respectively rigidly attached to the inner ends of said arms and the mid-point of which is rigidly secured to one surface of said piston for rigidly securing said piston to the inner ends of said arms so that the latter are deflected on a movement of said piston in either direction along its axis of travel, and means for measuring the deflection of the arms as a measure of the difference in the pressures applied to the opposite sides of said diaphragm.

2. The combination of claim 1, further comprising an adjustable stop carried by said top cap for limiting the extent of travel of said piston in one of its directions of movement when the difference in the pressures of the fluids in said two compartments exceeds approximately a predetermined value.

3. The combination of claim 1, further comprising an adjustable stop carried by said bottom cap for limiting the extent of travel of said piston in its remaining direction of movement when the difference in the pressures of the fluids in two said compartments exceeds approximately a predetermined value.

4. In a differential pressure cell, a cylindrical body member having an enclosed chamber therein, a piston smaller in diameter than said chamber positioned within said chamber so as to have limited freedom of movement along a single axis, said piston having a flexible diaphragm larger in diameter than said piston and effectively dividing said piston into two similar parts along the middle of said piston and secured to sides of said pressure cell dividing said chamber into two separate and non-communicative compartments, each of said compartments being provided with an external opening adapted to have a fluid under pressure introduced therein, a pair of oppositely-disposed cantilever arms formed integrally with the internal side walls of said body member, said arms extending inwardly in coplanar fashion from said walls of one of said compartments, said arms lying in a plane essentially normal to the axis of the movement of said piston, a U-shaped connecting member attached rigidly to and bridging the inner ends of said cantilever arms, said connecting member being rigidly secured to said piston so that an axial movement of said piston in response to a change in the differential pressure between the respective compartments is transmitted through said connecting member to cause a deflection of said cantilever arms, and means for measuring the magnitude of said deflection.

References Cited in the file of this patent

UNITED STATES PATENTS

| | | |
|---|---|---|
| 2,266,608 | Kuehni | Dec. 16, 1941 |
| 2,539,892 | Cook | Jan. 30, 1951 |
| 2,694,315 | Swift et al. | Nov. 16, 1954 |
| 2,737,051 | Sanderson | Mar. 6, 1956 |
| 2,772,569 | Ruge | Dec. 4, 1956 |
| 2,914,743 | Nunn | Nov. 24, 1959 |